No. 894,211. PATENTED JULY 28, 1908.
L. A. KAUMP.
SEED TESTER AND PROPAGATOR.
APPLICATION FILED MAR. 14, 1908.
3 SHEETS—SHEET 1.
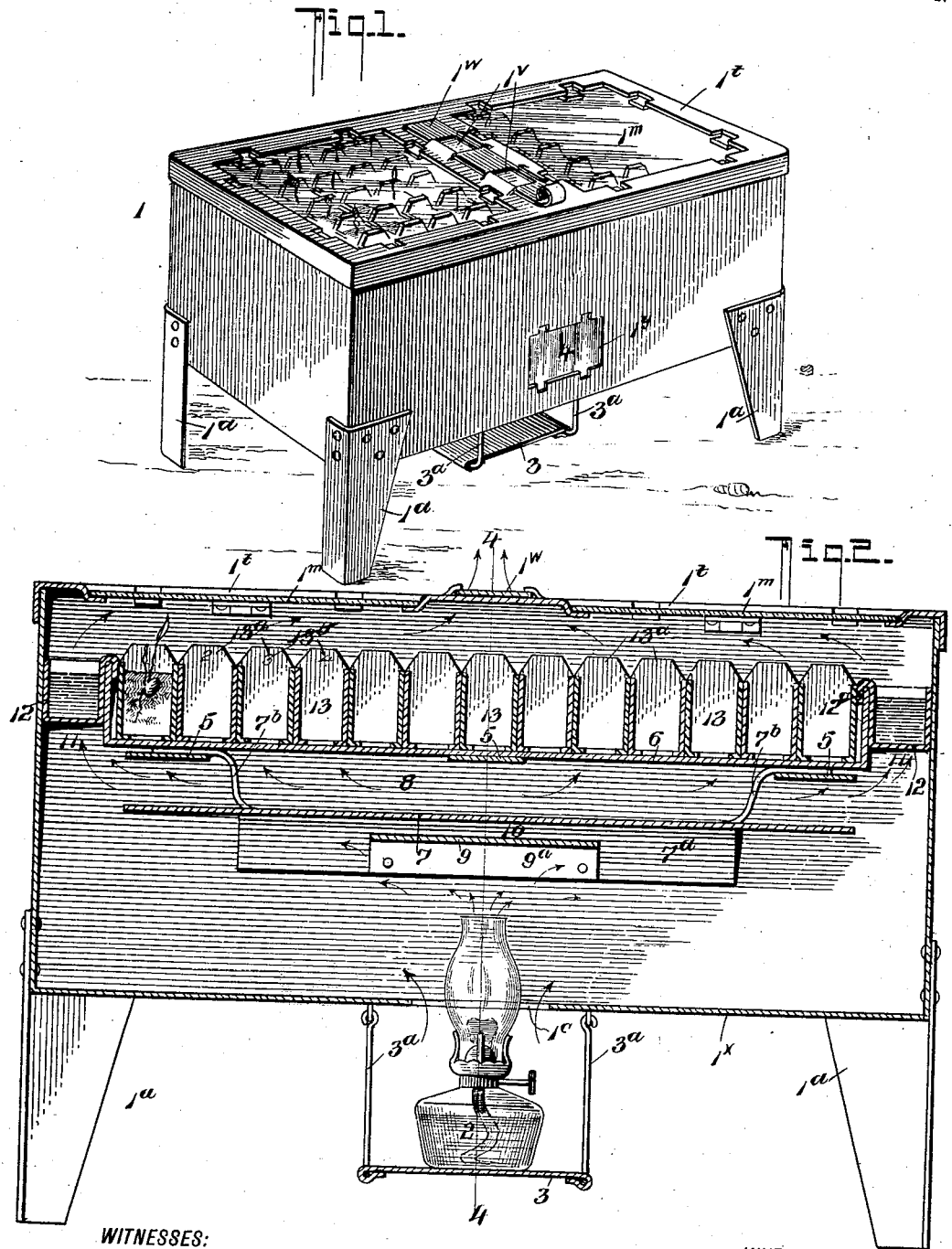
WITNESSES:
H. Woodard
John T. Schiott
INVENTOR
L. A. Kaump
BY
Fred G. Dieterich
ATTORNEYS

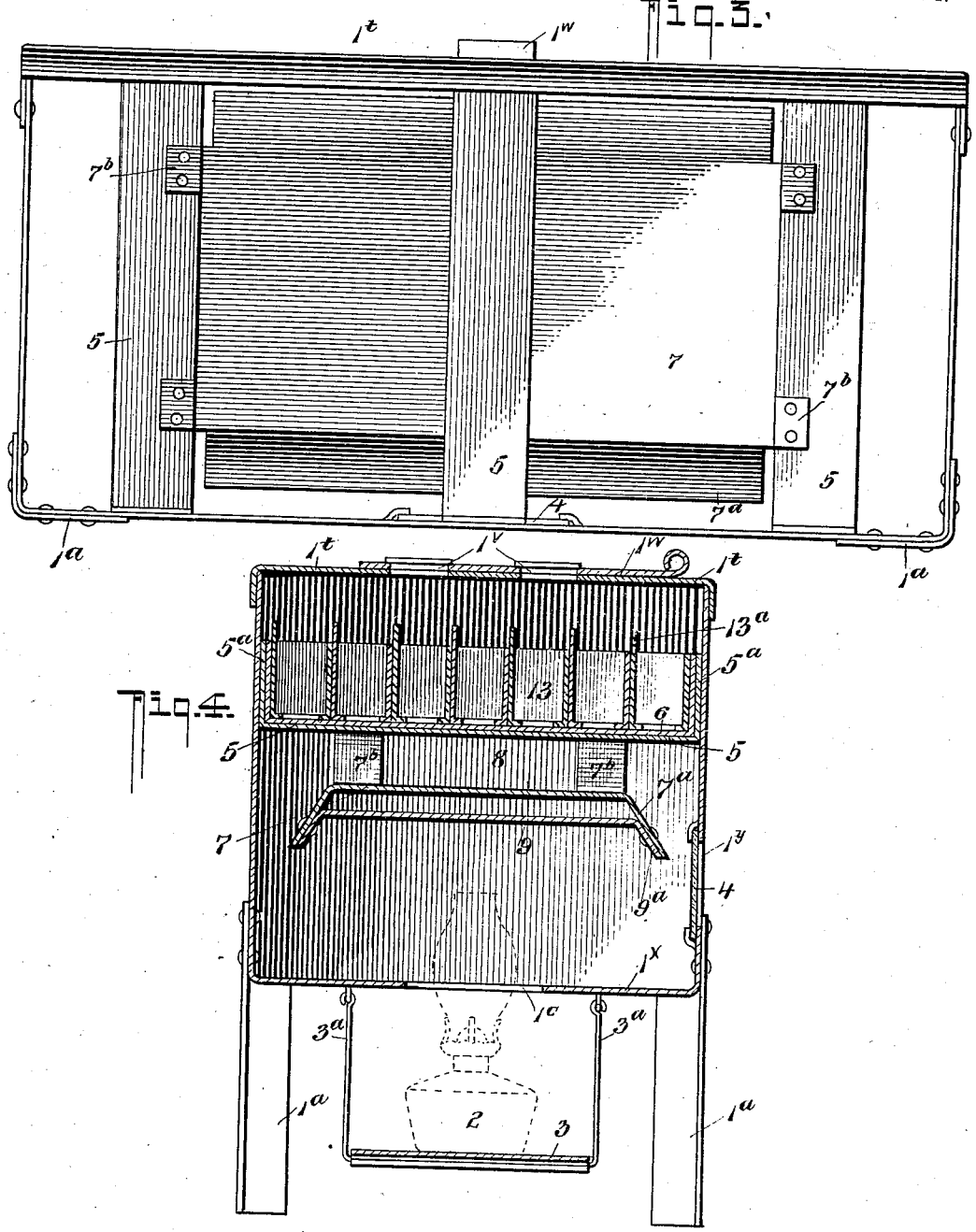

No. 894,211. PATENTED JULY 28, 1908.
L. A. KAUMP.
SEED TESTER AND PROPAGATOR.
APPLICATION FILED MAR. 14, 1908.
3 SHEETS—SHEET 3.
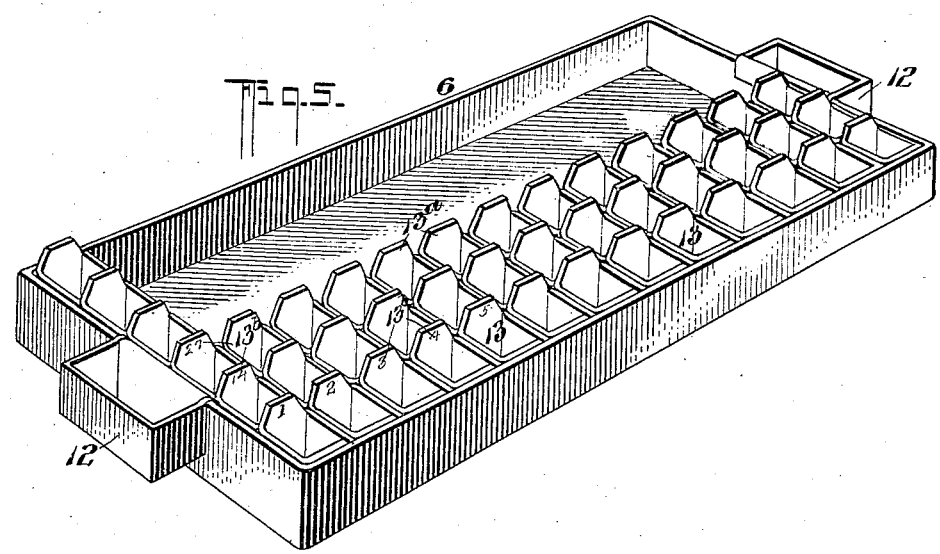
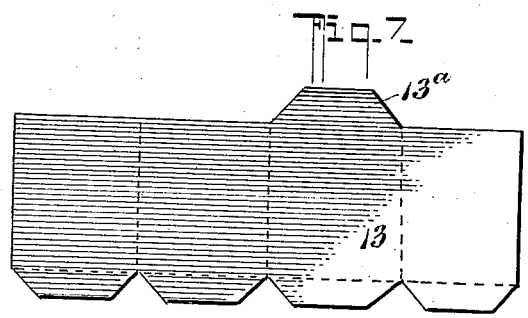
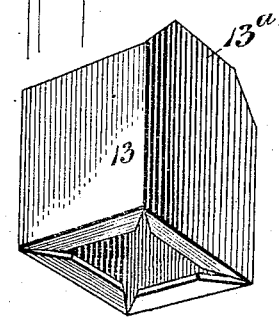
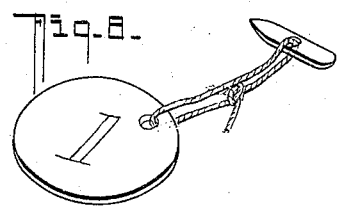
WITNESSES:
H. Woodard
John T. Schrott
INVENTOR
L. A. Kaump
BY
Fred G. Dieterich
ATTORNEYS

UNITED STATES PATENT OFFICE.

LESLIE A. KAUMP, OF SIOUX CITY, IOWA.

SEED TESTER AND PROPAGATOR.

No. 894,211.    Specification of Letters Patent.    Patented July 28, 1908.

Application filed March 14, 1908. Serial No. 421,230.

*To all whom it may concern:*

Be it known that I, LESLIE A. KAUMP, residing at Sioux City, in the county of Woodbury and State of Iowa, have invented certain new and useful Improvements in Seed Testers and Propagators, of which the following is a specification.

My invention relates to certain new and useful improvements in apparatus for testing and propagating seed and its primary object is to provide a machine wherein may be shown how increased crops can be positively raised under any conditions of the weather.

My invention also has for its object to provide a device of this character of a very simple and effective construction which can be easily and readily manufactured at a minimum expense.

In its generic nature the invention embodies a casing supported on suitable legs or standards in which is fitted a water-tight tray or pan, supported over a plate to provide an air circulation beneath the same and carrying water-tight cups at the ends, said tray adapted to contain a series of numbered bottomless vessels in which the seed is to be planted, means also being provided for heating air within the casing and circulating the same around the water-tight tray to reproduce, as nearly as possible, the natural atmospheric conditions.

In its more detailed nature, the invention embodies certain details of construction, which will be first fully described and then specifically pointed out in the appended claims, reference being had to the accompanying drawings, in which:—

Figure 1, is a perspective view of the invention. Fig. 2, is a central, vertical longitudinal section thereof. Fig. 3, is a top plan view, the water-tight tray being removed. Fig. 4, is a transverse section on the line 4—4 of Fig. 2. Fig. 5, is a detail perspective view of the water-tight tray, showing the removable water cup. Fig. 6, is a detail perspective view of one of the bottomless planting cups. Fig. 7, is a diagrammatic view of the blank from which seed cups are formed. Fig. 8, is a detail view of a marking tag used with my invention.

Referring now to the accompanying drawings in which like letters and numerals of reference indicate like parts in all of the figures, 1 designates the casing which is supported on suitable legs or standards $1^a$ and has a bottom $1^x$ provided with an aperture $1^c$ to coöperate with the lamp 2 that is supported on a swinging shelf 3, swung from the bottom $1^x$ of the casing by supports $3^a$, as clearly indicated in Figs. 2 and 4 of the drawings.

The front wall of the casing is provided with an aperture $1^y$ covered by a transparent plate 4, through which the operator may observe the lamp.

5 designates a series of straps having ends $5^a$ secured to the front and back walls of the casing, the straps 5 lying horizontally and serving to support the water-tight tray 6, hereinafter again referred to.

7 designates a heat deflector having down-turned sides $7^a$ and open ends, as indicated in Figs. 2 and 3 of the drawings, the heat deflector 7 being provided with hangers $7^b$, by means of which the heat deflector is secured to the end straps 5 to space it with its top surface in a plane below that containing the straps so as to leave an open space 8 between the heat deflector 7 and the tray 6.

9 designates a primary heating plate whose ends $9^a$ are secured to the sides $7^a$ of the heat deflector 7 and spaced to provide an air space 10 between it and the top of the heat deflector 7, the plate 9 serving to receive the direct heat from the lamp 2.

The tray 6 is of less length than the casing, although preferably of substantially the same width, so as to leave air spaces 11 at the ends of the tray, the spaces 11 being divided by moisture pans 12 suspended over the ends of the tray 6 by the bent over edges $12^a$ of the pans, the pans 12 serving to receive water that is to be evaporated by the heat to moisten the air passing over the tray 6.

The tray 6 is adapted to contain a series of cups or containers 13, each of which has an open bottom and top, as indicated in Fig. 6 of the drawings, and the cups 13 may be formed of a single piece of metal, or any suitable material, and are provided with upwardly projecting portions $13^a$ adapted to receive a serial number for purposes of identification.

The top $1^t$ of the casing 1 may be hinged to the casing body, if desired, and may be provided with transparent portions $1^m$—$1^m$ as shown in Fig. 1 of the drawings, ventilating apertures $1^v$ are provided in the top of the casing, and these apertures are governed by a slide valve $1^w$, whereby the area of the opening may be increased or decreased as may be found desirable.

In the practical application of my invention if it is desired to test seed corn, for instance, the grains to be tested are taken off the ear and planted in the cups 13, the ear from which the seed that is planted in a particular cup is taken is provided with a marking tag, such as shown in Fig. 8 of the drawings, containing the same serial number as that which appears on the cup for purposes of identification.

The seed is planted in the cup, after the cup has been filled with earth, sand, etc. and the cups are placed in the tray 6, which has first been filled about one-half full with water, thus permitting the water to gradually surround and overflow the seed cups 13. The cups are left in this condition from three to four days, giving the weak seeds a chance to rot, after which heat is applied through the medium of the lamp 2 to cause the air to be heated and moistened, it being understood that the cups 12 are filled with water. As the heat from the lamp 2 acts upon the heating plate 9, the same will cause the air beneath the heat deflector 7 to become warm and also warm the air above the heat deflector 7 and between it and the tray 6, the air entering the casing from the aperture in the bottom. The warm air then passes up around the ends of the tray 6 through the air spaces 11 and over the top of the tray 6 and the cups 13 contained therein and out through the ventilating apertures 1ʳ in the top of the casing.

The apparatus may be constructed of metal, wood or any other suitable material, and I do not desire it to be understood that I limit myself to the detailed construction of parts shown in the drawings and described in the specifications, as numerous slight changes may be made without departing from the spirit of the invention or the scope of the appended claims.

From the foregoing it will be seen that by the use of my seed tester a good crop may be insured even if the season is unfavorable, as the seed propagated in my apparatus may be transplanted, if desired, the glass or transparent cover portion serving to permit access of the rays of the sun to the seed cups and thus the apparatus will also act as a hotbed or "hot house", when placed in the sun.

The construction of the heating apparatus insures a perfectly even heat over all parts of the germinating tray as the continual flow of fresh, warm, moist air is maintained as near the natural conditions as possible and is supplied to all parts of the tray.

From the foregoing description taken in connection with the accompanying drawings it is thought the complete construction, operation and advantages of my invention will be readily understood by those skilled in the art to which the invention appertains.

What I claim is:

1. In a seed tester, a casing, a heat deflector having downwardly depending sides supported thereon, means for applying heat beneath said heat deflector, a tray supported over said heat deflector within said casing, a series of seed cups held within said tray, and means for maintaining an air circulation within the casing.

2. A seed tester comprising a casing, means for applying heat through the bottom of said casing, a heat deflector mounted in said casing over said heat applying means, a tray mounted in the casing over said heat deflector and spaced therefrom, said tray being of less length than the casing to leave air passages between the end of the tray and the casing, said tray adapted to contain seed cups, moisture pans supported from the ends of said tray, said casing having ventilating apertures.

3. A seed tester comprising a casing, means for applying heat to the bottom of said casing, a heat deflector mounted in the casing over said heat applying means, a tray mounted in the casing over said heat deflector and spaced therefrom, said tray being of less length than the casing to leave air passages between the end of the tray and the casing, said tray adapted to contain seed cups, moisture pans supported from the ends of said tray, said casing having ventilating apertures, and means for controlling said ventilating apertures.

4. A seed tester comprising a casing, means for applying heat through the bottom of said casing, a heat deflector mounted in said casing over said heat applying means, a tray mounted in the casing over said heat deflector and spaced therefrom, said tray being of less length than the casing to leave air passages between the end of the tray and the casing, said tray adapted to contain seed cups, moisture pans supported from the ends of said tray, said casing having ventilating apertures, means for controlling said ventilating apertures, said casing top having transparent portions to permit access of sunlight to the tray.

5. A seed tester comprising a casing, means for applying heat through the bottom of said casing, a heat deflector mounted in the casing over said heat applying means, a tray mounted in the casing over said heat deflector and spaced therefrom, said tray being of less length than the casing to leave air passages between the end of the tray and the casing, said tray adapted to contain seed cups, moisture pans supported from the ends of said tray, said casing having ventilating apertures, means for controlling said ventilating apertures, and a heating plate mounted beneath said heat deflector to coöperate with said heat applying means.

6. A seed tester comprising a casing, means for applying heat through the bottom of said casing, a heat deflector mounted in said casing over said heat applying means, a tray mounted in the casing over said heat deflector and spaced therefrom, said tray being of less length than the casing to leave air passages between the end of the tray and the casing, said tray adapted to contain seed cups, moisture pans supported from the ends of said tray, said casing having ventilating apertures, means for controlling said ventilating apertures, said casing top having transparent portions to permit access of sunlight to the tray, and a heating plate mounted beneath said heat deflector to coöperate with said heat applying means.

7. A seed tester comprising a casing having an aperture in its bottom and having a top provided with ventilating apertures, a heating device supported in the aperture in the bottom of the casing, said casing having a transparent portion in one wall to exhibit the heating means, a heat deflector supported within said casing over said heating means, a heating plate carried by said heat deflector and spaced beneath the same, a tray within said casing and spaced therefrom, said tray being of substantially the same width as the casing but shorter to leave air spaces at the ends, moisture cups mounted in said tray.

8. A seed tester comprising a casing having an aperture in its bottom and having a flat top provided with ventilating apertures, a heating device supported in the aperture in the bottom of the casing, said casing having a transparent portion in one wall to exhibit the heating means, a heat deflector supported within said casing over said heating means, a heating plate carried by said heat deflector and spaced beneath the same, a tray within said casing and spaced therefrom, said tray being of substantially the same width as the casing but shorter to leave air spaces at the ends, moisture cups mounted in said tray, said casing having a transparent portion in its top to permit passage of sunlight in the tray.

LESLIE A. KAUMP.

Witnesses:
H. NELSON,
H. V. PETERS.